Inventor
Edgar J. Justus

United States Patent Office 3,074,300
Patented Jan. 22, 1963

3,074,300
AUTOMATIC CONTROL AND DRIVE FOR MILLS
Edgar J. Justus, Beloit, Wis., assignor to Beloit Iron Works, Beloit, Wis., a corporation of Wisconsin
Filed Apr. 20, 1959, Ser. No. 807,497
11 Claims. (Cl. 80—54)

This invention relates to a differential drive controlled continuous mill which may be manually or automatically adjusted to various predetermined speed schedules. More particularly, this invention relates to a continuous rolling mill of the type suitable for hot reducing tubes and pipes of steel or the like under tension or, in other words, to a stretch reducing mill of the type having a plurality of roll stands through which hot tubular billets are drawn to be reduced to pipe or tubing of a predetermined diameter and wall thickness.

It is a feature of the present invention to provide a drive control system for a continuous mill such as a stretch reducing mill of the type having a plurality of sequentially positioned roll stands which control system includes a differential drive which is essentially a simple, high quality gear drive so that the operation, service factors, time ratings, etc., are those of gearing. To this differential drive associated with each stand there is supplied through gear connections driving power at constant speed. Each of the differential drives includes hydraulic means actuated by a minor portion of the supplied power to vary the speed of the output shaft of the differential drive. The hydraulic means may, for example, comprise a hydraulic motor and pump arrangement wherein the speed variation is controlled by the displacement of the pump which in turn may be varied by an electrical servo motor. This servo motor may either be manually actuated by the mill operator to increase or decrease the speed of any given stand, or it may be actuated by a servo mechanism which holds the stand speed to a predetermined value in accordance with stored information. Preferably, facilities are provided to store two different pre-set speed values so that while the servo system is being controlled to operate the mill in accordance with one value, new values may be read into the other storage facility in order to introduce a new desired speed schedule so that the mill can be changed from one program or speed to another without shutting down operation. These and other features are achieved with maximum efficiency, simplicity of operation, and economy of manufacture.

It is thus an object of the present invention to provide a drive control system for a continuous mill which system may be used to automatically or manually control the mill in accordance with a wide range of predetermined speed schedules.

It is a further object of this invention to provide such a system wherein the mill may be switched from automatic operation in accordance with a first predetermined speed schedule to automatic operation in accordance with a second predetermined speed schedule without shutting down the operation of the mill.

It is a further object of this invention to provide such a control system having fast response to speed control and affording sensitive and accurate operation.

It is a further object of this invention to provide such a control system affording considerable flexibility so as to be able to meet widely different speed schedule requirements.

It is a further object of this invention to provide such a drive control system affording a high degree of rigidity of drive after having attained the desired speed thus maintaining constant speed ratios after they have been selected.

It is a further object of this invention to provide such a drive control system wherein expensive components such as tachometers are eliminated by providing a servo motor driven potentiometer to produce a voltage indicating the relative speed setting of each roll stand in the mill.

Other objects, features and advantages of the present invention will be more fully apparent to those skilled in the art from the following detailed description taken in connection with the accompanying drawings in which like reference characters refer to like parts throughout and wherein.

Figure 1:
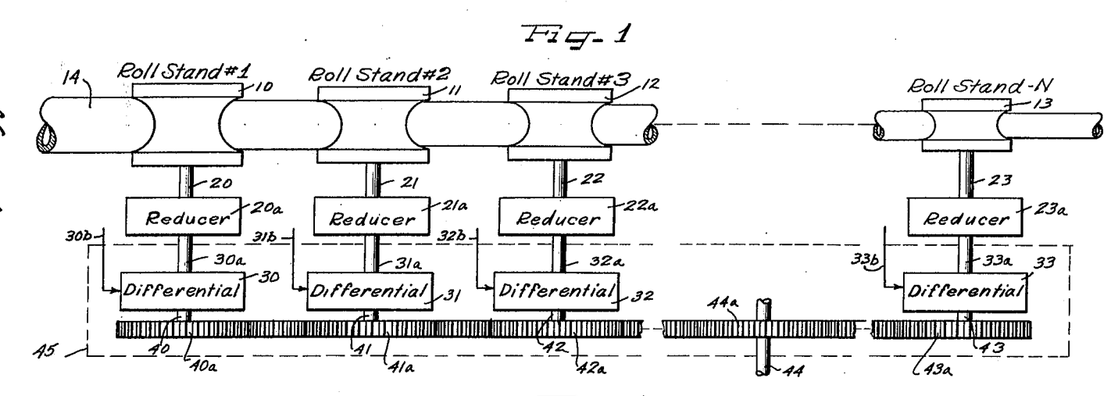
FIGURE 1 is a block diagram schematically illustrating a continuous mill drive control in accordance with the present invention.

In FIGURE 1, there is shown a block diagram representation of a tube mill which converts pierced hot cylindrical metal billets into pipes and tubing. The mill may be of any conventional construction in general and it will be understood that the control system to be described is applicable to mills other than stretch reducing mills which are discussed herein for purposes of illustration only.

The typical mill shown in FIGURE 1 comprises a plurality of sequentially arranged roll stands, the roll of the first stand being indicated by the reference character 10, the roll of the second stand being indicated by the reference character 11, the roll of the third stand being indicated by the reference character 12, and the roll of the last or nth stand being indicated by the reference character 13. Of course it will be understood that at each stand there is a pair of rolls positioned adjacent each other to form a nip between which the pierced metal billet is passed under tension. In FIGURE 1, the metal billet being drawn through the mill is indicated by the reference character 14. In practice, such stretch reducing mills generally receive a billet which is about five to six inches in exterior diameter, is about 40 feet long, and has an interior dimension of about two to three inches. This billet is reduced to elongated piping or tubing of a controlled diameter and wall thickness by a mill. For example, such a billet would produce about 300 feet of one-half inch pipe. The mill can be operated to vary the diameter and the wall thickness of the pipe by regulation of the nip loads and torque inputs, and by regulation of the relative speed relationship between adjacent roll stands.

Presently known drive unit control systems have encountered particular difficulty when the steel or other metal reaches its yield point as is necessary in each nip. The required torque is then so greatly reduced that the released load on the electric driving motor or other driving means tends to speed up the motor so as to require over compensation for correction in speed. Since the metal must be worked in its yield point range at each nip throughout the mill and since tube mills usually have from sixteen to twenty or more roll stands, it is obvious that individual electric drives for each roll stand are very expensive, unduly complicated, and never sensitive to meet all conditions. Hydraulically controlled drives which have in the past been developed, on the other hand, have also proved unduly expensive and have not achieved the flexibility characteristic of most control systems. In particular, some hydraulic systems have commonly required that the mill be shut down in order to change the speed schedule to which the mill is adjusted. This intermittency of operation has tended to considerable inefficiency and increased cost of operation.

In the drive control system of the present invention, it is possible, on the other hand, to change the speed of one or all of the stands while the mill is in operation. This change may be made either by a manual speed control for each individual stand, or it may be made through an automatic pre-set speed control system whereby the mill is switched from one pre-set speed schedule for all of the stands to a different pre-set speed schedule while the mill is in operatiin. The manual or automatic mode of operation may be switch selected.

As noted above, the tubular billet 14 to be reduced or stretched into piping is introduced into the first roll stand 10 and thence fed through the sequentially arranged roll stands such as 11, 12, and 13. In the drawing, only four such stands are shown by way of example but it will, of course, be understood that any convenient number of stands can be used. In practice, mills of this type commonly have from 16 to 22 stands.

Each of the roll stands is driven through a shaft such as the shaft 20, 21, 22, and 23 associated with the respective roll stands. The shafts are driven through reduction gears 20a, 21a, 22a, and 23a respectively. In a typical mill, it is desired that the speed of the stands increase as the material progresses through the mill. That is to say, the speed of the first two stands 10 and 11 may be the same, and thereafter the speed of such successive stand will be higher. Hence, the ratio of the reduction gearing will decrease as one progresses through the mill in order to achieve these different speed ratios for successively higher speeds.

Figure 2:
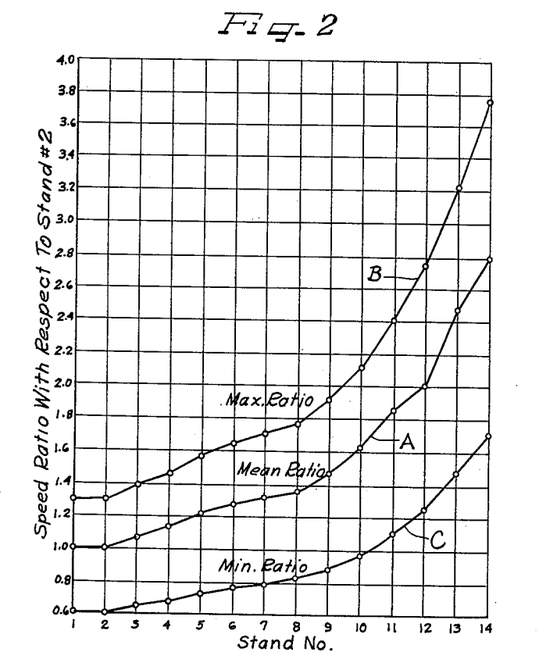
FIGURE 2 is a graph in which the speed ratio with respect to the speed of the first stand of the mill is plotted as ordinate against the stand number as abscissa.

In FIGURE 2, there is shown a graph of typical speed relationships between the various stands of an exemplary 14 stand mill. In this graph, the stands are plotted by number as abscissa and the ratio between the speed of each stand and that of the second stand is plotted as ordinate. In the central curve indicated by the reference numeral A, these speed ratios as determined solely by the ratios of the reduction gearing are plotted. In other words, the curve A in FIGURE 2 is a plot of the speed ratios which will be produced solely as a result of the difference in ratio of the reduction gears 20a through 23a. It will be noted that the speed of the second stand will be equal to that of the first stand whereas the speed of the 12th stand, for example, is approximately twice that of the first or second stand.

In practice, in order to draw tubing of different diameters or wall thicknesses, it is frequently desirable to vary the relationship between the speed ratios of the stand established by the ratios of the reduction gears. Hence, there is associated with each roll stand, a differential drive assembly such as the assemblies 30, 31, 32, and 33 respectively. These differential drives have output shafts 30a, 31a, 32a, and 33a which are connected to the reduction gearing units 20a, 21a, 22a and 23a respectively. Each reduction gear unit, in turn, drives the main shaft for its stand. Each differential drive assembly has a control signal input line such as the lines 30b, 31b, 32b, and 33b for a purpose to be described in detail below.

A central main input shaft 44 drives a gear 44a which in turn is meshed to drive main power input gears for each of the stand drives. Thus, the gears 40a, 41a, 42a, 43a, etc., are all meshed in a single train with the gear 44a so that power applied to the main input shaft 44 is distributed through the train of gears to each of the shafts 40, 41, 42, and 43, associated with each of the individual roll stands respectively. These latter shafts supply power at constant shaft rotation speed to the differential assembly of each roll stand. The differential assemblies in response to signals or settings applied over their control lines 30b, 31b, 33b, etc., transmit this power at an increase or decrease of speed as determined by the nature of the control signal through the shafts 30a, 31a, 32a, 33a, etc., to the fixed ratio reduction gears which in turn drive the main shafts of each roll stand.

Thus, referring to FIGURE 2 again, it will be noted that the curve B defines the upper limit by which the speed ratios between stands can, in the exemplary embodiment described herein, be increased by the differential units. The lower curve C, on the other hand, defines the limits by which the speed ratios can be reduced by the control afforded by the differential units. Thus, it will be apparent that by applying suitable signals to the control lines of the differential units, one can program the speed of the various stands in the mill to fall along any desired line within the area bounded by the curves B and C of the graph in FIGURE 2. These limits correspond roughly to a plus or minus increment of about 30–40% to be afforded by the differential control units to the natural speed ratios established by the reduction gearing.

As is indicated by the dash line block 45 in FIGURE 1, it is preferred to enclose the main input power gear train and the differential units for each of the roll stands in a single casing which extends the length of the mill along one side thereof. The reduction gearing for each roll stand may conveniently be placed in the housing supporting the roll thereof. Of course, although each stand is shown in FIGURE 1 as having only a single roll, it will be understood that in practice two opposing rolls are utilized to form a nip therebetween and are driven in opposite directions so as to urge opposite sides of the stock 14 in the same direction by suitable gearing taken off after the reduction gearing shown. Since this particular feature is conventional in the art, it has not been illustrated in detail herein.

Figure 3:
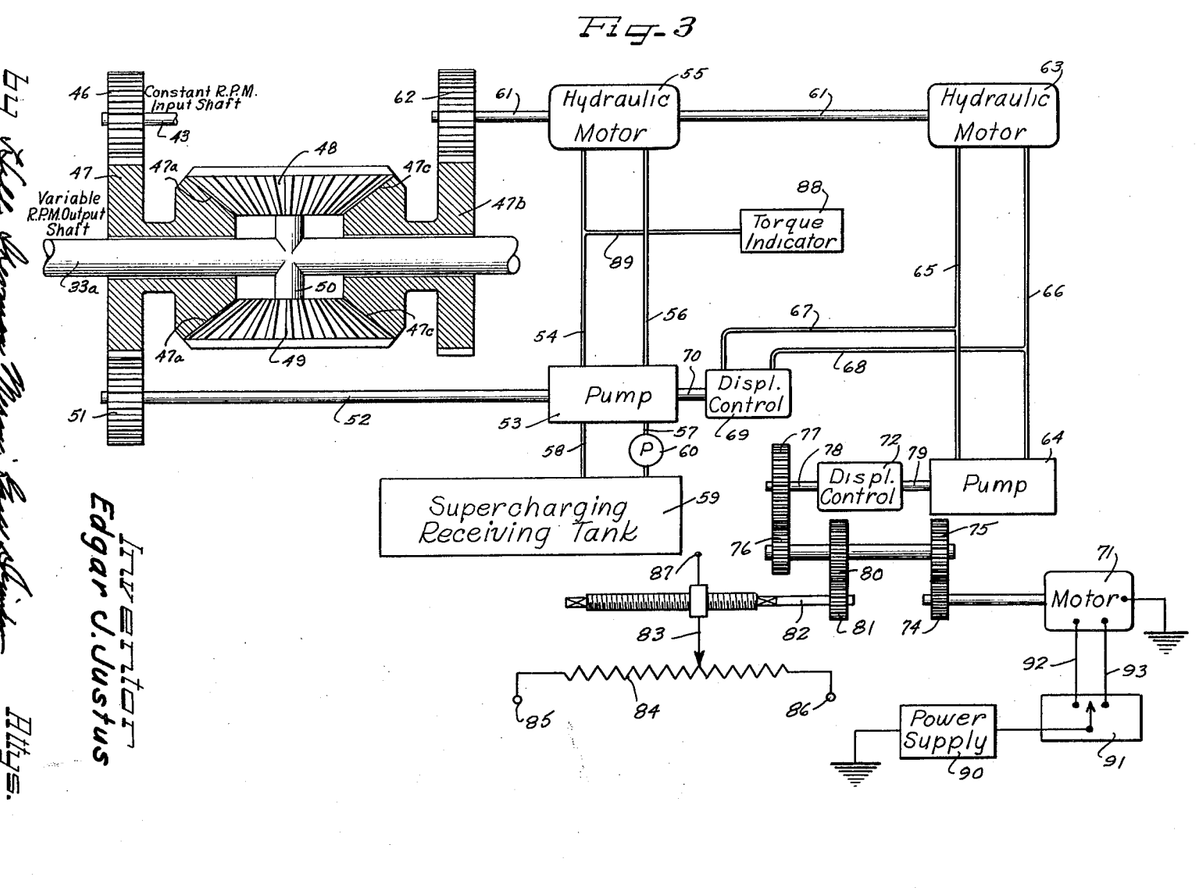
FIGURE 3 is a detailed block diagram of the differential drive associated with the shaft of the roll for each stand.

Turning now to FIGURE 3, there is shown a more detailed, schematic and block diagram of a differential unit of the type which is shown in FIGURE 1 as being associated with each of the roll stands. Thus, each of the differential units 30, 31, 32, and 33 shown in FIGURE 1 comprises a mechanism of the type shown in detail in FIGURE 3. For convenience in the use of corresponding reference characters, the differential associated with the last roll stand has in fact been illustrated. Thus, the gear 46 is driven from the shaft 43 which in turn would be driven by the constant speed power input gear 43a. Gear 46 in turn drives a first differential gear element 47 which may be journalled for rotation about but independentsly of the output shaft 33a of the differential unit. Gear element 47 is provided at one face thereof with a bevel gear 47a which is meshed with and drives each of a pair of bevel gears 48 and 49 respectively. Bevel gears 48 and 49 are journalled for free rotation about cross shaft 50 which is integral with the output shaft 33a. Of course, the entire assembly of bevel gears 48 and 49 and cross shaft 50 is also free to rotate about the axis of the output shaft 33a when the differential is appropriately actuated in a manner to be described below.

Gear 47 is also meshed with a gear 51 which is integral with a shaft 52 which is connected to drive a constant speed variable displacement hydraulic pump 53. Pump 53 has an output line 54 connected to a variable speed constant displacement hydraulic motor 55. Hydraulic fluid such as oil is supplied by pump 53 through line 54 to drive the motor 55 and is returned from motor 55 to hydraulic line 56 to the input of the pump 53. The inputs and outputs of pump 53 may also be respectively connected by lines 57 and 58 to a super charging receiving tank 59 for the hydraulic fluid. A separate motor driven pump 60 in line 57 maintains the fluid in tank 59 under a predetermined pressure higher than that used in the hydraulic system of the differential control so that minute slow leaks in the system may be compensated for and an accurate pressure level maintained.

Hydraulic motor 55 has an output shaft 61 which drives both a gear 62 and a slave hydraulic motor 63. The gear 62 is meshed to drive the second gear element 47b of the differential assembly which in turn is meshed with the bevel gears 48 and 49. Differential gear 47b is shown only schematically and is of course mounted for free rotation about the axis of the output shaft 33a independently of the rotation of this shaft in any convenient and suitable manner. The hydraulic system including basically the constant speed variable displacement pump 53 and the variable speed constant displacement hydraulic motor 55 acts essentially as a variable ratio gear connection in a manner which will be described in detail below. That is to say, by suitably adjusting the displacement of the pump 53, it is possible to vary the ratio between the speed of rotation of shaft 52 driving pump 53 and the shaft 61 which is driven by the hydraulic motor 55. It is thus seen that a minor part of the power supplied through shaft 43 and gear 46 at constant speed is transmitted through gear 51, shaft 52 and the hydraulic pump 53 and motor 55 and after being so transmitted is applied through gear 62 to the second differential gear 47b. Of course, pump 53 could also be independently driven from any convenient source of power.

Thus, the main power is derived from the input shaft at a constant speed or r.p.m. for any given schedule of operation of the mill. It should, of course, be understood that the input shaft or gear, which is common to all stands, could be varied in speed and in such a case all stands would have their speed varied in direct proportion. Such an adjustment would vary the absolute speed of all stands but would not vary the speed ratios shown in the graph of FIGURE 2. It has been noted that each of the differential assemblies by means of which variation in speed ratios between individual stands is achieved comprises two input gears 47 and 47b and an output shaft 33a which carries the two small bevel gear pinions 48 and 49. The input gear 47 has a set of gear teeth 47a meshing with the bevel gear pinions and the input gear 47b has a set of bevel teeth 47c which also meshes with the bevel gear pinions 48 and 49.

First, consider the situation where gear 47b and its attached bevel gear 47c are held stationary. If gear 47 now turns, the small pinions 48 and 49 will walk on the bevel gear 47c and thereby rotate the output shaft 30a at a speed equal to one-half the speed of rotation of the gear 47. A similar result would be obtained if gear 47 were held stationary and gear 47b were rotated. In this instance, the pinion gears 48 and 49 would walk on bevel gear 47a and again rotate output shaft 33a at one-half the speed of rotation of gear 47b. In general, for any combination of speeds of rotation of gears 47 and 47b, it can be shown that the speed of rotation of output shaft 33a is equal to one-half the algebraic sum of the speeds of the rotation of gears 47 and 47b. Thus, in order to control the speed of rotation of the output shaft 33a, the speed of rotation of gear 47b is controlled through controlling the speed of hydraulic motor 55 which in turn is controlled by varying a displacement control in pump 53 in a manner to be described below.

It should be first noted, however, that the power transmitted to the output shaft 33a by gears 47 and 47b is directly proportional to the relative rotational speeds of these gears respectively. If gear 47 turns at 1000 r.p.m. and gear 47b turns at 100 r.p.m. the power input imparted to shaft 33a by gear 47 will be ten times the power imparted by gear 47b. From this it is evident that if an adjustment of speed is necessary over a relatively small range, most of the power can be transferred through gear 47 to shaft 33a from a constant r.p.m. source, and that the variation in speed necessary can be accomplished by varying the speed of gear 47b. Also, the amount of variable power which must be delivered to gear 47b will be small because the variation in speed required is small. On large mill drives, this means that most of the power can be transmitted from a simple, economical highly reliable constant speed source and that the variable power necessary can be supplied from a variable speed source of much lower horsepower rating, or can be derived directly from the main input source in the manner shown in FIGURE 3.

The accuracy of the drive is also improved by the ratio of the variable to the constant horse power. For instance, if the variable speed drive should have a speed variation error of one percent and the power input from the variable speed drive was only one tenth of the total power input, the speed input from the variable drive would also only be one tenth of the total and therefore the error variation on the main output shaft would only be one tenth of one percent. Because this drive arrangement is essentially a simple, high quality gear drive, the operation, service factors, time ratings, etc., are those of gearing. As noted above, the system comprising the driven hydraulic pump 53 and the hydraulic motor 55 is used for the variable portion of the differential drive. The hydraulic pump and motor 53, 55, are adjustable in ratio of speeds and may, for example, be of the type manufactured by the Oil Gear Company of 1560 West Pierce Street, Milwaukee 4, Wisconsin and described in detail in that company's bulletins Nos. 10600 and 47001. Of course, it will be understood that any suitable variable displacement pump and variable speed hydraulic motor could be used.

The shaft 61 which is driven by the hydraulic motor 55, as noted above, not only drives gear 62 but also drives the slave hydraulic motor 63 which necessarily rotates at the same speed as the primary motor 55. The slave hydraulic motor 63 receives hydraulic fluid from a slave pump 64 through a hydraulic line 65 and returns fluid to the pump 64 through hydraulic line 66. Hydraulic line 67 is tapped off from the high pressure line 65 and hydraulic line 68 is tapped off from the low pressure return line 66. A pump displacement control unit 69 is actuated in proportion to the pressure difference existing between lines 67 and 68 and hence in proportion to the difference existing between lines 65 and 66. The pump displacement unit 69 is connected to actuate a shaft 70 to control the displacement per revolution of the pump 53 and thereby adjust the speed ratio between pump 53 and motor 55 to the same ratio as is established by the system between pump 64 and motor 63 of the slave system. The advantage of using the slave system is that the electric motor 71 which, through appropriate gearing to be described below, drives the pump displacement control unit 72 for pump 64 can be of a relatively low power rating.

The output shaft 73 of motor 71 is provided with gear 74 which drives a gear 75 integrally attached to a geared shaft 76 which in turn drives gear 77 which is attached to the shaft 78 actuating the displacement control unit 72 which adjusts the displacement of pump 64 through shaft 79. The geared shaft 76 may also integrally carry a gear 80 which drives a pinion gear 81 integrally attached to a shaft 82 which is connected to position the wiper arm 83 of a potentiometric resistance 84 in accordance with and as a measure of the degree of rotation of shaft 74 and hence as a measure of the degree of actuation of the displacement control unit 72 of pump 64. The potentiometer 84 is provided with terminals 85 and 86 which are connected in an electrical circuit to be described below and the potentiometer arm 83 is provided with an output terminal 87 from which the voltage on the wiper arm 83 may be read or connected.

Before considering the electrical control circuits of the system, however, it should be noted that the variable portion of each of the differential drive units uses a hydraulic pump and motor system which are adjustable in ratio of speeds. The pump is driven at a constant speed from the main input shaft. The pump has an adjustable displacement per revolution. The hydraulic motor is connected through gear 62 to gear 47b in the differential. The motor 55 has a constant displacement per revolution and a variable speed whereas the pump 53 has a constant speed and a variable displacement per revolution. Hence, setting of the displacement of the pump sets the ratio between pump r.p.m. and motor r.p.m. and, as a consequence, the ratio between the main input from gear 46 and the output through shaft 33a.

The hydraulic system is not subject to overheating and temperature problems commonly associated with electrical systems. It is essentially a rigid, ratio drive which may be adjusted as desired, but once set, holds a definite ratio in r.p.m. between pump and motor throughout the load range.

A torque indicator 88 may conveniently be actuated from a hydraulic line 89 connected to sense the hydraulic pressure in line 54 between pump 53 and motor 55. Speed ratio indications between stands may be obtained in a manner to be described below from voltages obtained from potentiometer 84. It is thus seen that the basic modification of the constant speed input power is made through a hydraulic system for the relatively minor variable portion of the power and that the electrical system to be described below may be operated at very low power levels since it serves merely to control the slave hydraulic systems. These low electrical power levels contribute materially to the dependability and accuracy of the system.

The motor 71 which simultaneously drives the pump displacement control slide and the potentiometer arm so that these two elements are at all times proportionately positioned, is preferably of the servo type which is reversible in direction of rotation. Motor 71 may be either a direct current motor, the direction of rotation of which may be controlled by the polarity of the applied voltage or by the input terminal to which a voltage of given polarity is applied, or it may be of the two phase induction type commonly used for alternating current servo motors. For simplicity of discussion and illustration, it will be assumed that the motor 71 is of the direct current type. Motor 71 may then be actuated by applying a voltage derived from any suitable source of power 90 through a switching arrangement shown schematically by the switch arm 91 to one or the other of two input leads 92 and 93 to the motor 71. Push button or switching arrangements represented by the switch arm 91 are conveniently provided on a control panel associated with each roll stand of the mill for manual control or variation of speed of that stand. Such a control panel will conveniently also include the dial of the torque indicator 88 and the dials of speed ratio indicators to be described below.

In operation, when the attendant or the operator of the mill wishes to increase the speed of any given roll stand with respect to the preceding roll stands, the switch arm 91 is positioned so that motor 71 is actuated in a direction such as to move the pump slide displacement control of pump 64 so that the ratio of speed of hydraulic motor 63 to that of pump 64 is increased. This in turn actuates the pump displacement control 69 to produce a corresponding increase in the ratio of the speed of hydraulic motor 55 to that of pump 53. This in turn increases the speed of gears 61 and 47b with respect to that of gears 46 and 47 and thereby increases the speed of rotation of output shaft 33a. Should the operator wish to decrease the speed of any given stand the switch arm 91 is thrown to the opposite position and a decrease in speed is attained through analagous chain of events. At any given instant the position of the potentiometer arm 83 which is controlled by the gearing which is driven by motor 71 to control the pump displacement slide 72 indicates the position to which the displacement control slide has been driven and hence indicates or is a measure of the modification of the constant speed input by the particular differential drive unit. Since, in practice, such input is at constant speed, the potentiometer arm 83 therefore affords an analogue measure of the actual speed of the roll stand when the voltage derivable from this arm is connected in the appropriate circuit to be described below.

Figure 4:
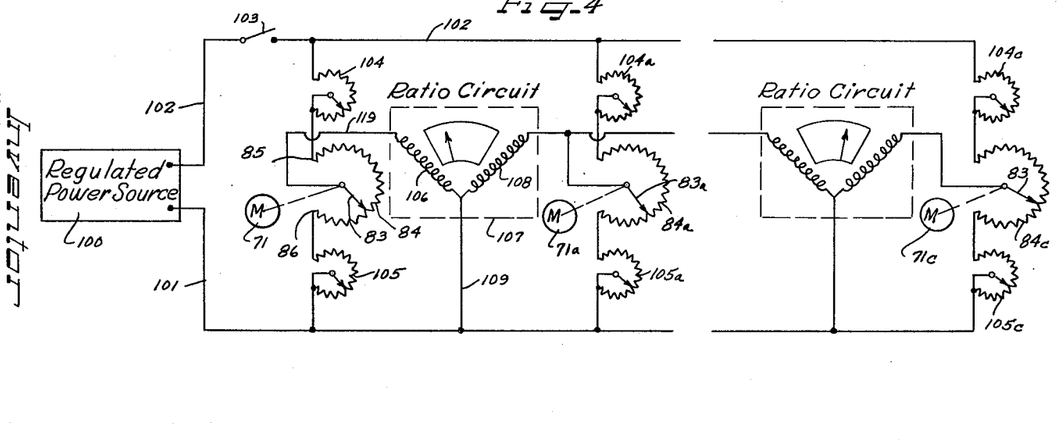
FIGURE 4 is a schematic circuit diagram of an electrical circuit adapted to actuate differential drives of the type shown in FIGURE 3 for manual control of the system shown in FIGURE 1.

Turning now to FIGURE 4, there is shown a circuit by which the speed ratio cone shown plotted in FIGURE 2 is instrumented on an analogue basis. It will be noted from FIGURE 4 that the output of a regulated power source such as an accurately regulated direct current source 100 is applied through main power lines 101 and 102 through on-off switch 103 to a group of circuits connected in parallel across the main lines 101 and 103, there being one similar parallel circuit for each roll stand in the mill. For example, one such parallel connected circuit is shown at the left of FIGURE 4 including the motor 71 (as also shown in FIGURE 3) connected to drive the wiper arm 83 of the potentiometer 84. The terminal 85 of potentiometer 84 is connected through a variable resistance 104 to the power line 102 and similarly, the terminal 86 of the potentiometer 84 is connected through another variable resistance 105 to the power line 101. As noted above, there is a similar parallel branch for each roll stand in the mill and the circuit diagram in FIGURE 4 is shown broken by the dash line to indicate the fact that there are as many parallel branches as there are mill roll stands.

For purposes of convenience of illustration, let us assume that the output of the regulated D.C. source 100 is 40 volts. It will be noted from the graph of FIGURE 2 that the speed ratios to be instrumented vary from 0.6 to approximately 3.75 or through range of 3.15. Hence, it is convenient in this illustrative discussion to assume as a scale factor that a change in speed ratio of 1.0 shall be represented by 10 volts, i.e., that each volt represents a ratio change of 0.10. The circuit of FIGURE 4 is to be so adjusted as to represent all of the values between the curves B and C (i.e. between 0.6 and 3.75 or a range of 3.15) on a consistent voltage scale. The first parallel branch circuit at the left of FIGURE 4 represents the values of the graph of FIGURE 2 for stand 1 as well as for stand 2 (since their speed settings are the same). For these two stands 1 and 2, the variable resistance 105 is adjusted so that 6 volts drop of the total of 40 volts is across this resistance 105 to represent the analogue of the minimum speed ratio available for stand 2 as shown by the stand 2 ordinate of 0.6 on curve C of FIGURE 2. The variable resistance 104 is adjusted so that 27 volts drop of the total of 40 volts is across this resistance 104 to represent the analogue of the maximum speed ratio available at stand 2 as shown by the ordinate value of 2.7 for stand 2 on curve B measured down from the maximum or 4.0 ordinate level. Thus, the 6 volts taken from one end of the 40 volt range and the 27 volts taken from the other end of the 40 volt range leave a 7 volt range across the entire resistance of the potentiometer 84. This 7 volt range is a true analogue of the speed ratio range of 0.7 at stand 2 as shown in FIGURE 2 by the difference between the 1.3 ordinate on curve B and the 0.6 ordinate on curve C. It is also to be noted that the voltage drop across variable resistor 105 is to form part of the desired 10 volt output for the potentiometer wiper arm as explained immediately below. The potentiometer wiper arm 83 is then so connected to the gearing shown in FIGURE 3 that when the pump displacement control slide is in the neutral position so that gear 47b is rotating at the same speed as gear 47, then the potentiometer wiper arm will be positioned so that the voltage output will be 10 volts, i.e., so that the voltage appearing on the potentiometer wiper arm 83 will be the full 6 volt drop across variable resistor 105 and 4 volts of the 7 volt drop across the potentiometer. In other words, the pump displacement control slides and the potentiometer wiper arms are initially so connected and the variable resistors such as resistors 104 and 105 are initially so adjusted that when the system is set for a zero speed change by each of the differentials, the voltage appearing on the potentiometer wiper arms will be an analogue of the values plotted in curve A of FIGURE 2. Furthermore, the limits of variations of this voltage as defined by the settings of the variable resistors are analogues of the curves B and C respectively as shown in FIGURE 2.

Similarly, the potentiometer 84a in FIGURE 4 which would be associated with the second roll stand would be identically connected inasmuch as the speed and speed ranges of the second stand are the same as that of the first. On the other hand, the potentiometer 84c shown in in FIGURE 4 would, in the above illustrative example, be connected to the components associated with the fourteenth roll stand and would be connected to represent the range of values shown associated with the fourteenth roll stand at the extreme right hand edge of the graph of FIGURE 2. In similar fashion to the above described adjustments for stand 2, the variable resistor 104c for stand 14 is adjusted so that 2.5 volts drop of the total or 40 volts is across this resistance 104c to represent the analogue of the maximum speed ratio available at stand 14 as shown by the ordinate value of 0.25 for stand 14 on curve B measured down from the maximum or 4.0 ordinate level in FIGURE 2. The variable resistor 105c is adjusted so that 17 volts drop of the total or 40 volts is across this resistor 105c to represent the analogue of the minimum speed ratio available at stand 14 as shown by the stand 14 ordinate of 1.7 on curve C measured up from 0. Thus, the 2.5 volts taken from one end of the 40 volt range and the 17 volts taken from the other end of the 40 volt range leave a 20.5 volt range across the entire resistance of the potentiometer 84c. This 20.5 volt value is slightly more than half of the full 40 volt drop between lines 102 and 101. The potentiometer arm 83c would be so connected to its associated gearing that when the slide control or pump displacement of the system associated with the fourteenth gear stand is in its neutral position the total voltage appearing on the potentiometer arm 83b would be 28 volts. Of course, it will be understood that the above numerical values are given by way of example only and that any convenient scale factor could be chosen to instrument on an analogue basis, the particular speed ranges for which any given machine may be designed in accordance with its intended application.

Turning again to FIGURE 4, it will be noted that the potentiometer arm of the potentiometer associated with the first roll stand is connected to one end of a first coil 106 of a ratio circuit or meter 107 and that the potentiometer arm 83a from the second or next adjacent stand is connected to one end of the other coil 108 of the ratio meter. The other ends of coils 106 and 108 are connected together and are each connected by line 109 to what may be taken as the grounded line 101 leading back to the D.C. source. The ratio circuit 107 may be any electrical circuit or device which will determine the ratio between the voltage appearing on the arm of potentiometer 83a to that appearing on the arm 83. That is to say, the circuit is one which divides the voltage on a given potentiometer arm by the voltage on the potentiometer arm of the preceding roll stand. In practice, this ratio meter may, for example, conveniently be a model 919 meter manufactured by the Weston Meter Company. Essentially, such a meter is a galvanometer with two coils built into its armature so that impressed voltages create opposing torques against the magnetic field created by the stator. The characteristics of the coils and the displacement of the field results in a division of one imposed torque by the other and the result is the ratio between the two inputs displayed on the meter. Since the inputs to the coils of the meter are from the potentiometer arms of succeeding stages and since the voltages on these potentiometer arms are in numerical analogy with the speeds of the roll stand associated with the stages, it is apparent that the ratio meter 107 will give a reading of the ratio existing between the speed of adjacent roll stands. That is to say, the variable trimmer resistors 104 and 105 of each stage are adjusted and inserted across the voltage supply lines in order to locate the voltage range of the potentiometer into numerical analogy with the position of the control slide of the hydraulic slave pump for the particular roll stand and therefore into numerical analogy with the output speed of that unit. The position of the potentiometer wiper arm is directly proportional to the position of the control slide of the slave pump. The voltage on the wiper arms of the potentiometers of adjacent stages is then applied to a ratio circuit or ratio meter in order to measure the pull out ratio or speed ratios of a second stand with reference to a first stand.

Figure 6:
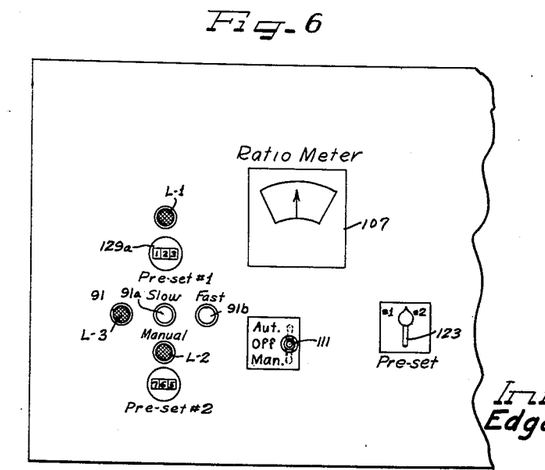
FIGURE 6 is a plan view of a control panel incorporating the control elements of the system of FIGURE 5.

Turning now to FIGURE 6, it will be noted that the dial of the ratio meter 107 for each stand may conveniently be mounted on a control panel 110 associated with each stand. An operator of the mill may then read from the meter 107 the existing speed ratio and may increase or decrease this ratio when the mill is set for manual operation by pushing control buttons 91a or 91b which may actuate the arm 91 in the arrangement shown in FIGURE 3 so as to control the motor 71 for that roll stand in the manner discussed above. It will further be noted from FIGURE 6 that a three position switch 111 is provided which may be used to set the mill either for manual operation as discussed above, for automatic operation as to be discussed below, or to a central off position. When the mill is set for manual operation, the pilot light L-3 is illuminated indicating the fact that the mill is set for manual operation and that the speed of the particular roll stand may be controlled by actuating the push button 91a to reduce the speed of that stand or by actuating the push button 91b to increase the speed of that stand. While actuating these controls, the operator may observe on the ratio meter 107 an instantaneous reading of the ratio of the speed of the stand being controlled to the speed of the preceding stand. In this manner, each stand may be separately manually adjusted so as to achieve any desired program within the limits of the range of possible adjustment as indicated by the area within the curves B and C in FIGURE 2.

Figure 5:
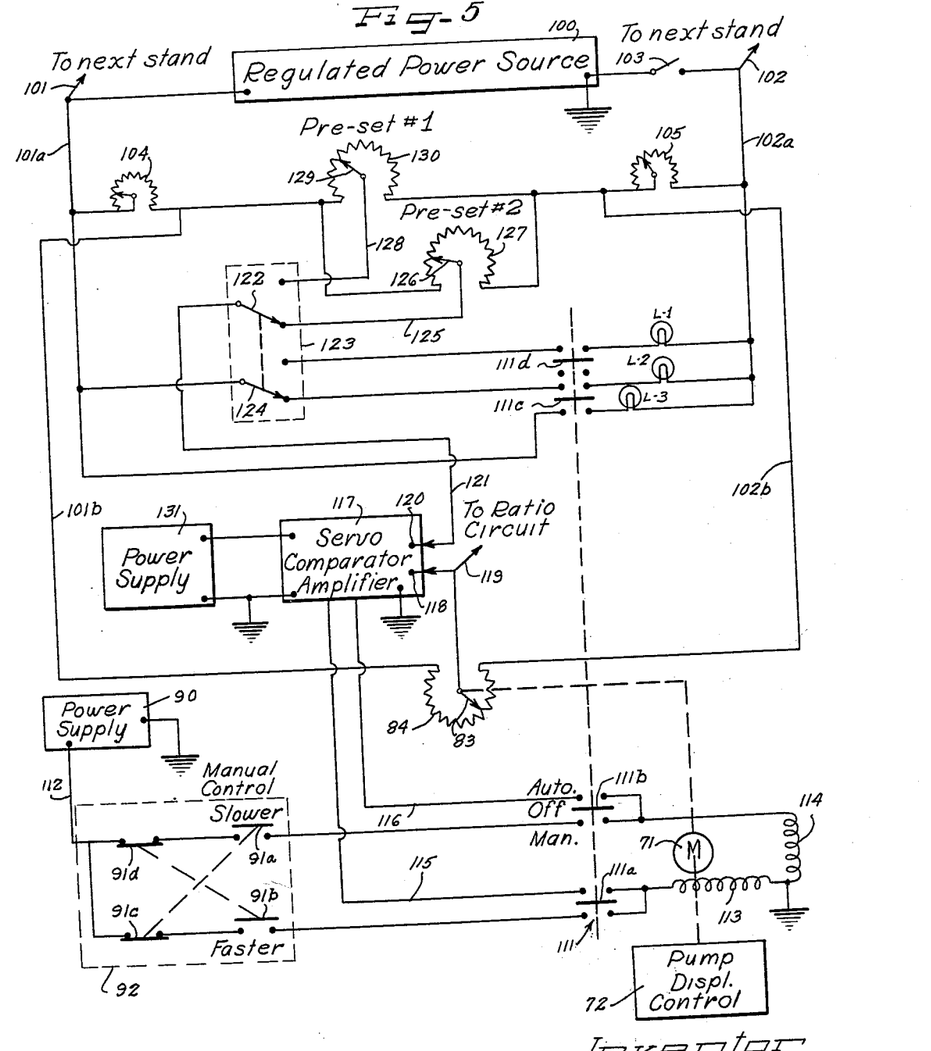
FIGURE 5 is a schematic circuit diagram of an electrical system adapted to automatically actuate differential drives of the type shown in FIGURE 3 to control a system of the type shown in FIGURE 1.

Of course, this manual adjustment of each individual roll stand separately is a time consuming process. It is therefore, frequently desirable to provide an automatic control circuit whereby the speed desired for any given stand may be stored as a piece of information in any convenient storage facility such as a potentiometer the output from the arm of which may be compared to the voltage representing actual speed of the stand and the error or difference signal than applied to actuate a servo system to automatically adjust the speed of all of the stands simultaneously to the desired values. A schematic circuit diagram of such an automatic control system which may be used in conjunction with the apparatus and circuitry described heretofore is shown in FIGURE 5. It will be understood that the circuits of FIGURES 4 and 5 are both a part of the same system used to control the apparatus of FIGURES 1 and 2 and that the showing in separate figures is for clarity and convenience of illustration only. Of course, the circuits shown in FIGURES 4 and 5 respectively could be used separately either without the other, but in practice, it is intended that both circuits will be included in the apparatus in the manner to be described below.

Referring now to FIGURE 5, parts which have already been discussed in connection with FIGURE 4 will be seen to have been indicated by the same reference character. For example, the regulated power source 100 has output lines 101 and 102 and the on-off switch 103. The main lines 101 and 102 are indicated in FIGURE 5 as leading to the next stage or, that is to say, to the circuitry for the next roll stand, it being understood that the circuitry shown in FIGURE 5 is used to control a single roll stand only and that this circuitry is duplicated for each of the roll stands in a manner similar to the parallel connection indicated in FIGURE 4. Feeder lines 101a and 102a are connected to the main power lines 101 and 102 and have a plurality of branch circuits connected across them. For example, the variable trimmer resistances 104 and 105 which have previously been discussed in connection with FIGURE 4, are connected by lines 101a and 102a to the main power lines 101 and 102 respectively. The potentiometer 84, the arm 83 of which is driven by motor 71, is also shown in both FIGURES 4 and 5 and in the latter figure is indicated as being connected in series between the two trimmer resistances by leads 101b and 102b which connects the two ends of the potentiometer 84 in series with the trimmer resistances 104 and 105 in the manner shown in FIGURE 4.

As noted above, in connection with FIGURE 6, there is provided on the control panel 110, a three-position switch 111 which can be set for manual, automatic or off positions. This switch and its connection in the control circuitry is also shown in FIGURE 5. From FIGURE 5, it will be seen that the switch 111 comprises four physically or mechanically ganged switch arms 111a, 111b, 111c and 111d for each roll stand. Of course, in practice the switches 111 of each roll stand would also normally be ganged so that operation of one switch would operate all of the switches. From FIGURE 5, it may be seen that when the switch 111, the arm of which is shown in solid lines in the central off position, is thrown to manual operation, the arm 111d rests on open terminals and the arm 111c rests on a pair of terminals associated with it and thereby completes a circuit to the indicator lamp L3 back to the power lines 101a and 102a thereby lighting the indicator lamp L3 on the control board to indicate that the apparatus is set for manual operation.

The motor driven potentiometer arm 83 of potentiometer 84 is, of course, permanently connected across the power supply 100 for any position of the arms of switch 111. This potentiometer can be de-energized only be opening the main power switch 103.

In the manual position of switch 111, it will be noted that the switch arms 111a and 111b are in the lower position in which they connect windings of the motor 71 through the switch 92 having the switch actuating buttons 91a and 91b to the power supply 90 used for manual actuation of the motor 71 to thereby drive the pump displacement control 72 and provide through adjustment of the arm 83 of potentiometer 84 a measure of the pump displacement setting and hence, of roll stand speed. Each of these elements utilized in the manual control of the apparatus, have previously been generally discussed in connection with FIGURES 3 and 4. Somewhat greater detail of the switch 92 is however, shown in FIGURE 5. In particular, it will be noted that the push button switch arm 91a is mechanically ganged to a second arm 91c and that the push button switch arm 91b is also mechanically ganged to a second switch arm 91d. Power supply 90 is connected through a conductor 112 to the switch arm 91d and thence through a series circuit including the switch arm 91a to the manual position terminal of the switch arm 111b. Power supply 90 is also connected through conductor 112 in a second circuit parallel to the first including the switch arms 91c and 91b connected in series to the manual position terminal of switch arm 111a. The manual terminals of switch arms 111a and 111b are respectively connected to windings 113 and 114 of motor 71 which are then connected together and to ground. Since the power supply 90 is also connected to ground, it is apparent that in the manual position of switch 111 closing of either switch arm 91a or 91b respectively will actuate the motor 71 through one or the other coils 114 or 113, but that closing of both 91a and 91b simultaneously will open arms 91c and 91d so that the motor is not actuated at all thus affording a safety feature.

When, on the other hand, the switch 111 in FIGURE 5 is placed in its upper position so that the circuit is set for automatic operation, it will be noted that one or the other of the coils 113 and 114 of motor 71 are actuated through conductors 115 and 116 respectively which lead from a servo-comparator-amplifier 117 to the upper or automatic position terminals of the switch 111. Servo amplifier 117 has as a first input to one of its input terminals 118 a signal derived from the arm 83 of potentiometer 84. As indicated by the arrow 119 the voltage on arm 83 is also applied over a suitable conductor to the ratio meter 107 in the manner shown and for the purpose discussed in connection with FIGURE 4.

A second input terminal 120 of servo amplifier 117 is connected by a conductor 121 to one of the arms 122 of a switch 123 having two ganged arms 122 and 124 effectively forming two ganged single pole double throw switches. The second switch arm 124 is connected to one of the power lines 101a and the two terminals to which this switch arm may be connected are themselves respectively connected through the terminals of switch arms 111c and 111d for the automatic position of switch 111 through a pair of indicator lamps L1 and L2 respectively to the power line 102a. Thus, when the switch 111 is thrown to the automatic position, the switch arm 124 in its lower position will cause the lamp L2 to be lighted and in its upper position will cause the lamp L1 to be lighted.

The switch arm 122 of switch 123 in its lower position is connected by a conductor 125 to the wiper arm 126 of a first information storage or preset potentiometer 127. Similarly, the terminal on which switch arm 122 seats in its upper position is connected by a conductor 128 to the wiper arm 129 of a second information storage or preset potentiometer 130. The ends of the two preset potentiometers 130 and 127 are connected in parallel between the variable trimmer resistances 104 and 105 and hence are also connected in parallel with the motor operated potentiometer 84 which is also connected between these trimmer resistances. Hence, potentiometers 84, 127 and 130 are seen to be connected in parallel with each other and in series with the trimmer resistances 104 and 105 between the two power lines 101a and 102a. As noted above, in connection with the operation of the circuit of FIGURE 4 in which only the motor driven potentiometer 84 is shown, the variable resistances 104 and 105 are adjusted to numeric analogy with the speed ratio range to be defined for the given roll stand in accordance with the graph of FIGURE 2. Of course, the same voltage drop will appear across the full resistance of each of the three potentiometers 83, 127 and 130.

As noted above, the two inputs to the amplifier 117 are the voltages appearing on the wiper arm 83 of potentiometer 84 and the voltage appearing on line 121 which is connected either to wiper arm 129 of preset potentiometer 130 or to wiper arm 126 of preset potentiometer 127 depending upon the position of the switch 123 which can be adjusted from the control panel 110. It will, of course, be understood that in operation the wiper arm of one of the preset potentiometers 127 or 130 is adjusted by any convenient means such as a manual adjustment knob to a position on the potentiometer which represents the desired speed for that particular roll stand in any given speed schedule. The position of the wiper arms 126 and 129 respectively may conveniently be read on the control panel 110 by noting the reading on dials 129a and 126a which may be of the conventional counter indicator type to indicate the position of the potentiometer wiper arm. Such dials and very accurate means of adjusting potentiometer wiper arms are well known in the general purpose analogue computer art and need not be further discussed herein. As soon as one or both of the wiper arms of the preset potentiometers have been set to a desired value or values, the switch 123 is thrown to the appropriate position to select that particular value with which it is desired to begin the next operating sequence. This adjustment of switch 123 applies the voltage apearing on the selected preset potentiometer as an input to the amplifier 117 where it is compared with the other input from the wiper arm 83 of potentiometer 84. It will be recalled that the position of wiper arm 83 is proportional to the actual speed which the hydraulic system is set to maintain for that particular roll stand whereas the position of the preset potentiometer is of course proportional to the desired speed for that particular roll stand.

The servo amplifier has a comparator circuit of conventional suitable design as its input whereby the difference or error between the signals on lines 121 and 119 respectively is determined. This error signal is amplified and applied according to its polarity over either line 115 or line 116 to actuate the motor 71 in such a direction as to reduce the error signal to zero. The amplifier 117 may be operated from any convenient power supply 131 which can, depending upon the needs of any particular system, be simply another output from the power source 100, or can be identical with the power supply 90.

It should be understood that although it is normally preferred to make the analogue measurements of potentiometer settings with unidirectional or direct current voltage, nonetheless, in general, all of the functions of the circuits shown in both FIGURES 4 and 5 can be performed either with direct current or alternating current techniques and components. Hence, power sources are indicated in general terms rather than specifying which is intended since either can be used. The servo amplifier 117 itself may be of conventional design.

Where it is desirable to use an alternating current servo the D.C. signals derived from the potentiometers can be used to control modulators to produce suitable A.C. input signals to this amplifier. Where it is desired to use a transistorized A.C. servo amplifier, one such suitable amplifier is manufactured by the Oil Gear Company and is described in their Bulletin 200 as their servo control power amplifier model number SC–AU 20–001. It should however be understood that the details of this amplifier or of the particular techniques used in the servo system do not form a part of the present invention and are not described in detail since it is believed that such servo techniques are well known in the art.

Thus, the motor 71 may be either a D.C. or an A.C. motor so long as it is reversible in direction and suited for use in a servo mechanism. Of course, the output of the amplifier 117 must be suitable to drive whatever motor is selected and the inputs to the amplifier 117 must also be suitable for the particular type of amplifier necessarily used. Should an A.C. amplifier be required and should it also be desired to use direct current voltages resulting in unidirectional signals, it is always possible to convert these to equivalent alternating current signals through the use of known modulation techniques.

As noted above, the circuitry shown in FIGURE 5 is that associated with one typical stand of the mill. Of course, identical circuitry is associated with each of the other stands. In operation, when as noted above, it is desired to prepare for automatic operation of the mill one of the sets of preset potentiometers is adjusted so as to store or represent information corresponding to the desired absolute speed for that particular stand. In this automatic mode of operation the ratio circuits as such are not utilized but are simply observed to verify the fact that the mill is operating properly. Once having set corresponding preset potentiometers for each of the roll stands the switch 123 may be thrown to the properly adjusted set of potentiometers and switch 111 then thrown to the position indicating automatic operation. The servo system associated with each of the roll stands will then adjust the slide box or pump displacement control 72 of the hydraulic system of its stand to such a value that the potentiometer arm 83 of potentiometer 84 will assume a position corresponding to the position of the previously adjusted wiper arm of the preset potentiometer. This action will occur simultaneously for each of the roll stands.

If now during the operation of the mill on this established speed schedule it is decided that as soon as the present batch of stock is drawn or reduced to tubing it would be desirable to switch to a different speed schedule, the unused set of preset potentiometers (one for each roll stand) can be adjusted while the mill is in operation so that their wiper arms represent the absolute speed for the associated roll stand to be followed in a different speed schedule. That is to say, while the mill is automatically operating on one preset speed schedule, the other set of potentiometers can be adjusted to read in the program for a second speed schedule to be followed after completion of the present batch. The mill can be switched immediately to this second speed schedule simply by throwing the switch 123 from one position to the other so that voltages picked off by the arm 122 come from the second set of preset potentiometers. This change in the input over line 121 to the servo amplifier 117 causes the servo system to readjust the speed of each stand in accordance with the second set of stored values and this readjustment can be made without shutting down operation of the mill.

Of course, if at any time after automatic operation of the mill has been started it is desired to modify the speed of only one of the stands, it is also possible to throw the switch 111 from the automatic to the manual position and thereafter to readjust the speed of one or any desired number of roll stands by manually actuating the push buttons 91a or 91b. The previously established setting of the motor driven potentiometers which has been established by the servo system under the automatic programming will, of course, not be effected until the manual control buttons are actuated and hence will not be effected for any stand in which these buttons are not actuated. Since the output of the amplifier 117 is disconnected from the servo motor when the switch 111 is in the manual position, it is also possible during this manual position setting of switch 111 to readjust both of the preset potentiometers without actually immediately changing the motor driven potentiometers. That is to say, in the manual position of switch 111 the wiper arm 83 of potentiometer 84 is not effected by changing the position of wiper arms 126 or 129 but can only be moved by actuating push buttons 91a or 91b. Once the preset potentiometers have been reset, the switch 123 may be thrown to the position corresponding to the next desired speed program and thereafter when the switch 111 is thrown back to the automatic position and the stands will be readjusted simultaneously to correspond to this preselected program.

While a particular exemplary preferred embodiment of the invention has been described in detail above, it will be understood that modifications and variations therein may be effected without departing from the true spirit and scope of the novel concepts of the present invention as defined by the following claims.

I claim as my invention:

1. A combined drive and drive control system for a continuous mill of the type having a plurality of sequentially positioned and adjacent roll means, said system comprising, a plurality of differential gearing drive means with one for each of said roll means, a substantially constant speed, common gear drive means connected to each said differential means to mechanically and directly supply the major part of the drive power to each said differential drive means, a plurality of adjustably variable displacement and correspondingly variable speed setting drive means each including a hydraulic pump and motor and each connected to one of said differential drive means and all mechanically driven by said common drive means to supply the remaining minor part of the drive power to each said differential means to vary the speed of the roll means driven thereby, a plurality of operator controlled and intermittently operable motor means each connected to adjustably regulate the displacement and correspondingly the speed setting of one of said hydraulic drive means and to simultaneously regulate the displacement and correspondingly the speed setting of an associated adjustable element measuring the displacement speed setting adjustment of its connected and associated hydraulic drive means and a plurality of indicators with one for each hydraulic drive means each comprising at least one comparison means connected to provide an analogue measure of the ratio between the displacement speed setting for the corresponding hydraulic drive means and the displacement speed setting for an adjacent hydraulic drive means to aid said operator in his control of said motor means.

2. A combined drive and control system for a continuous mill of the type having a plurality of sequentially positioned and adjacent roll means, said system comprising, a plurality of independently adjustable hydraulic, operator variable speed, drive means with one for each said roll means, a plurality of speed setting recording and storage means with one associated and operatively connected with each one of said hydraulic drive means to receive and store at least one desired and preselected new speed setting from a plurality of different possible such speed settings for its said associated hydraulic drive means in addition to its then operating, speed setting, and each said hydraulic variable drive means including a servo system connected to automatically change and adjust the speed setting of its associated hydraulic drive means to said desired, new speed setting during operation of said mill and without requiring a shut down.

3. A combined drive and control system for a continuous mill of the type having a plurality of sequentially positioned and adjacent roll means, said system comprising, a common drive means to mechanically supply the major part of the drive power for each of said roll means, a plurality of hydraulic and operator controlled variable speed drive means with one for each of said roll means, a set of a plurality of at least two information storage means, each set being operatively associated and connected to each said hydraulic drive means to receive and store information indicating desired speed settings for said connected hydraulic drive means, a separate servo system connected to each one of said hydraulic drive means to automatically adjust the speed setting of the associated hydraulic means to the speed represented in an operator selected one of said set of storage means, means to manually vary the speed setting in each unselected one of said storage means of each said set during the operation of said drive and control system, and means to switch the connection of each said servo system from one information storage means to another information storage means of its set while said drive and control system is operating so that said operation can be programmed and changed to different automatically controlled speeds without shutting down said drive system and the mill which is driven thereby.

4. A combined drive and control system for a continuous mill of the type having a plurality of sequentially positioned and adjacent roll stands, said system comprising, a plurality of variable speed differential gear drive units with one for each of said stands, a common, gear connected, drive means to supply the major portion of the drive power at constant speed to each of said differential drive units, a plurality of hydraulic pump and motor adjustable speed drive means each connected to one of said differential drive units to vary its output speed, a plurality of servo-motor means each connected to adjust one of said hydraulic drive means and to simultaneously adjust an element to provide a measure of the speed setting of the associated hydraulic drive means, a plurality of indicators for an operator with one for each hydraulic drive means and each comprising interconnections to provide a measure of a ratio between the speed setting of its associated hydraulic drive means and that of an adjacent one, a plurality of information storage means with one operatively associated with each said hydraulic drive means and each being adjustable by an operator to values representing at least one desired new speed setting for its associated hydraulic drive, and a plurality of means with one for each hydraulic drive means operatively connected to be actuated by the difference between the stored new speed setting and the said measure of the speed setting by said element to actuate said servo-motor to reduce said difference substantially to zero to thereby automatically adjust the output speed of said differential drive means to said operator selected, stored new speed setting.

5. For use in a mill of the continuous and stretch reduction type having a plurality of sequentially positioned and adjacent roll stands to be gear driven at successively higher speeds for successive stands, a combined drive and speed control system comprising, a common prime mover and a common direct geared mechanical drive means therefrom adapted to be connected to supply the major part of the drive power to each of the roll stands of the mill at different gear ratios for successively increasing higher speeds for successive stands, a plurality of independently operator adjustable variable speed control and drive units each connected to receive its drive power from said common prime mover and to supply the remaining and minor part of the drive power to a corresponding one of said roll stands and to vary its speed through a limited range, each of said variable control and drive units including an individually operable, manual control for the speed setting thereof, each of said control units also including at least one potentiometer to store at least one new speed setting, each end of each of said potentiometers being connected through a variable resistance to one terminal of a source of power, each of said potentiometers having an adjustably positioned wiper arm, the voltage on said wiper arm being determined by said adjustment through a range the limits of which are determined by the magnitude of said variable resistors respectively, said voltage on said wiper arm being in numeric analogy to the desired new speed setting for said associated control unit, each of said variable control and drive means units including a servo system connected to be responsive to said voltage to automatically change the speed setting of said units to the new setting corresponding to the value represented by the voltage on said potentiometer wiper arm, and means including interconnections between all of said units and actuatable by an operator at a single station to shift the operation of the whole system from individual manual control at the several units to automatic operation under the said stored new speed settings.

6. For use in a continuous mill having a plurality of sequentially positioned and adjacent roll stands, a combined drive and speed control system comprising, drive means including a plurality of independently operator adjustable variable speed control and drive units each adapted to be connected to a corresponding one of said roll stands to vary its speed, each of said units including a manually adjustable means for operator control of its speed setting, each of said units also including at least first and second new speed setting, storing potentiometer means each having a movable wiper arm whose position corresponds to a desired speed setting, said potentiometers being connected in parallel with each other and each having each of its ends connected through a variable resistance to a source of power, the magnitude of said variable resistances thereby defining the limits of the range of possible adjustment of the voltages on the wiper arm of the corresponding potentiometer, each of said units also including a servo system connected to automatically adjust the speed setting thereof to the speed setting represented by the voltage on the wiper arm of a selected one of said potentiometer storage means, each of said units including means connected to provide for operator adjustment of the position of the other and unselected potentiometer wiper arm during the operation of said system without interrupting or affecting its operation, and means including interconnections between all of said units and actuatable by an operator at any of said units to switch the control of said system from said individual manual control to said automatic control under said selected one of said potentiometer storage means, and to switch the connection of said servo system from said one selected storage potentiometer means to another and previously unselected storage potentiometer means during system operation so that said operation can be operator programmed in advance and subsequently and instantly changed by only one operator at a single station to a different set of automatically controlled speeds without interrupting the continuous operation.

7. For use in a mill of the stretch reduction and continuous type having a plurality of sequentially positioned and adjacent roll means, a combined drive and speed control system for manual and for automatic-manual operation comprising, a plurality of differential gear drive units each adapted to be connected to one of said roll means, common gear drive means to mechanically supply the major part of the drive power at different and successively higher constant speeds to each of said successive differential gear drive means, a plurality of hydraulic pump and motor variable speed drive means to supply the remaining and minor portion of the drive power at selectively varying speeds to each of said differential gear drive units, a plurality of operator controlled electric motor means intermittently operable and each connected to adjust the speed setting of one of said hydraulic pump and motor means and to simultaneously mechanically adjust a movable potentiometer in an electric circuit to provide a position responsive voltage which is a measure of the speed setting of said connected hydraulic means, each said potentiometer being connected in series between first and second variable resistances connected across a source of power, the adjustment of said variable resistances defining the upper and lower limits of the range of the speed setting representing voltages which can appear on each said potentiometer, a plurality of indicators each including at least one electrical circuit connected to each said electric motor means to provide a measure for the operator of the relationship between said speed setting indicating voltage on its potentiometer and the speed setting indicating voltage of the potentiometer associated with an adjacent electric motor means, and means including interconnections between all of said electric motor means to shift all of said electric motor means to an operator selected automatic control from a single station and permitting continued operator use of said indicators to observe the speed ratios between adjacent differential drive means during said automatic operation as well as during individual manual operation.

8. For use in a mill of the continuous and stretch reduction type having a plurality of sequentially positioned and adjacent roll stands, a combined drive and variable speed control system for manual and automatic-manual operation comprising, a plurality of variable speed differential gear drive units each adapted to be connected to drive one of said roll stands, common gear drive means connected to supply the major part of the drive power from a common prime mover to each of said differential units at different and successively higher constant speeds, a plurality of variable speed hydraulic drive means connected to supply the remaining and minor part of the drive power from said common gear drive means to each of said differential drive units to vary the output speed thereof, a plurality of electrical servo-motor means each connected to adjust the speed setting of one of said hydraulic drive means and to simultaneously proportionately adjust a first potentiometer to provide a voltage which is a measure of the differential unit output speed as determined by the adjustment of its associated hydraulic drive means, each of said plurality of electric servo-motor means including at least second and third potentiometers to store operator selected new speed settings and adjustably connected to provide voltages which are each a measure of desired new speed settings for their associated hydraulic drive means for different operating conditions of said mill, each of said electrical servo-motor means including a servo amplifier selectively and operator connectable to a selected one of said second or said third potentiometers and also to said first potentiometer to actuate said servo-motor means to reduce the difference between the speed representing voltages to which said amplifier is connected to zero, and means including interconnections between said plurality of electrical servo-motor means and operable by an operator from at least a plurality of said different electrical servo-motor means to selectively switch the connection of said servo amplifier from a previously selected one of said potentiometers and its speed setting to the other and a corresponding new speed setting without interrupting operation of the system and mill.

9. For use in a mill of the continuous type having a plurality of adjacent roll means driven at successively higher speeds which are also individually adjustable, a manual and selectively automatic speed control system comprising, a plurality of separate and independently manually adjustable speed control station units each to be connected to one said roll means of the mill, each said control unit also including means to store at least one operator selected speed setting for its control unit, and at least one means including interconnections between said control units selectively actuatable by an operator at a single station to shift all of said control units from their individual and manual control to automatic control with each station unit shifted to the new and previously stored speed setting without any interruption or shut down of operation.

10. For use in a mill of the continuous type having a plurality of adjacent and adjustable speed roll means, a speed control system for manual and automatic-manual operation comprising a plurality of separate and independently manually adjustable speed control station units each including a reversible and intermittently operable means to change the speed setting of each said station unit in either direction and each adapted to be connected to one of said roll means to control its speed, each said control unit also including operator actuatable means to store a plurality of operator selected and recorded desired new speed settings for that control unit and automatic speed setting changing means selectively connectable to be responsive to operator selection of one of said speed settings for that station unit, and means located at, and forming a part of, at least one of said station units and including interconnections between said plurality of control units to selectively and simultaneously shift all of said control units from individual manual control of their speed settings to automatic control of all of said units with each shifted to the new, operator selected, one of said previously stored speed settings, each said control unit including means whereby each new and automatically supplied speed setting may be manually varied during uninterrupted operation.

11. For use in a continuous mill having a plurality of adjacent and successive rolls to be driven at different and operator selected speeds, a manual and automatic-manual speed control system comprising, a plurality of different and independently manually adjustable speed control station units, each to be connected to one of said rolls to control its speed, each said control unit also including motor means to change its speed setting and operator actuatable means to store a plurality of operator preselected new speed settings for its control unit and automatic, speed setting changing means selectively connectable to be responsive to an operator selected one of said stored, new speed settings for that station unit, and each said control unit including interconnections between all of said control units and means for use by a operator at any one of said plurality of said station units to simultaneously and selectively shift all control units from individual manual control of their speed settings to automatic control with each station unit shifted to an operator selected one of said previously stored new speed settings, all without any interruption or shut down of system and mill operation and permitting continued operator adjustment of the speed setting for each individual control unit during such automatic operation.

References Cited in the file of this patent

UNITED STATES PATENTS

| | | |
|---|---|---|
| 1,580,368 | Boddie | Apr. 13, 1926 |
| 1,939,113 | Ferris | Dec. 12, 1933 |
| 2,384,962 | Pohl | Sept. 18, 1945 |
| 2,506,106 | Rendel | May 2, 1950 |
| 2,508,162 | Herwald | May 16, 1950 |
| 2,526,665 | Hull et al. | Oct. 24, 1950 |
| 2,536,876 | Dannatt | Jan. 2, 1951 |
| 2,579,648 | Chudyk | Dec. 25, 1951 |

OTHER REFERENCES

Iron and Steel Engineer, February 1956, pages 76–85.